United States Patent [19]

Lucas et al.

[11] 4,276,766
[45] Jul. 7, 1981

[54] ROUGHNESS SENSOR CALIBRATION

[75] Inventors: John M. Lucas, Montreal; Raman Nayar, Baie D'Urfe, both of Canada

[73] Assignee: Domtar Inc., Montreal, Canada

[21] Appl. No.: 126,984

[22] Filed: Mar. 3, 1980

[51] Int. Cl.³ .......................... G01B 5/28; G01B 11/30
[52] U.S. Cl. ...................................... 73/1 R; 356/243
[58] Field of Search .......................... 73/1 R; 356/243

[56] References Cited
U.S. PATENT DOCUMENTS

| | | | |
|---|---|---|---|
| 2,715,830 | 8/1955 | Lewis et al. | 73/1 R |
| 3,832,070 | 8/1974 | Cox | 356/243 |
| 4,035,085 | 7/1977 | Seiner | 356/243 |
| 4,047,032 | 9/1977 | Judge et al. | 356/243 |

Primary Examiner—S. Clement Swisher

[57] ABSTRACT

A calibrator for calibrating optical sensors that contact a moving web comprising, a rotating disc mounted on an oscillated platform and in a position to be contacted by the contacting part of the optical sensor. The disc is rotated and oscillated back and forth so that the point of contact of the optical sensor changes relative to the surface of the disc back and forth along substantially spiral paths.

3 Claims, 5 Drawing Figures

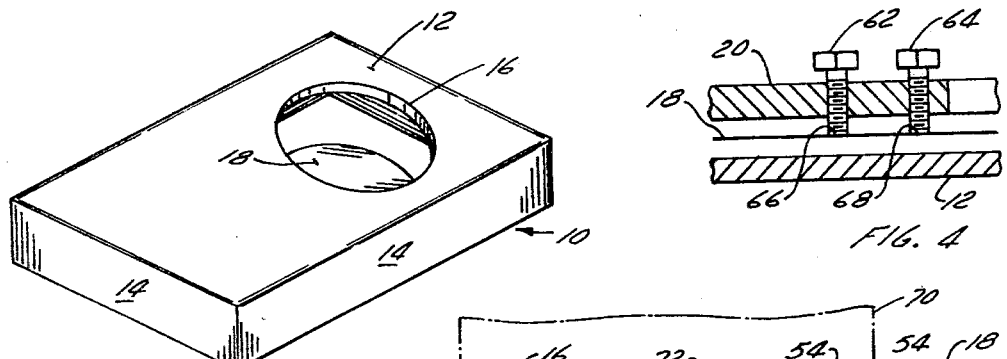
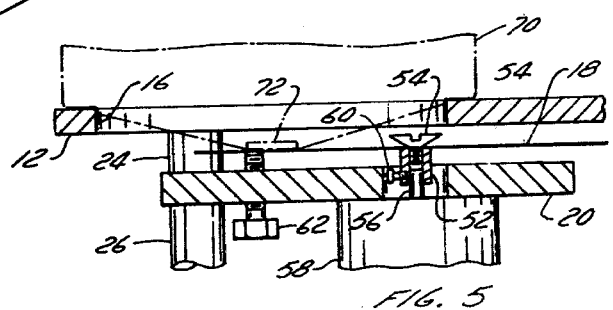
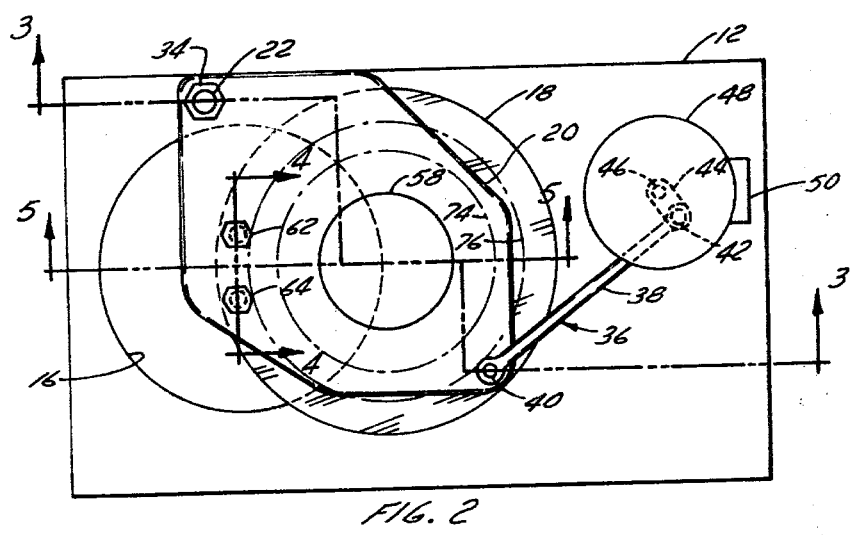
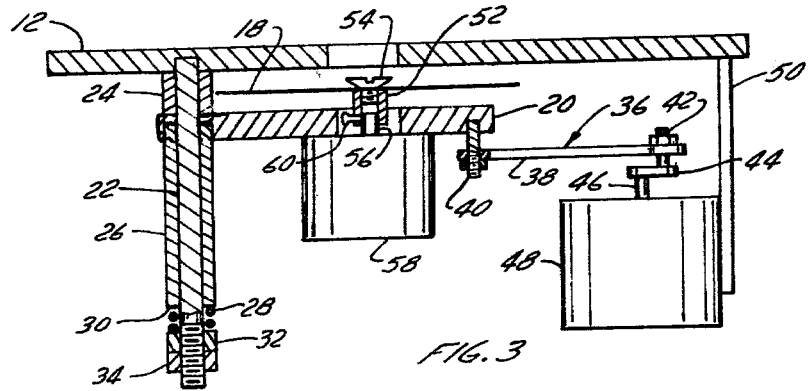

ROUGHNESS SENSOR CALIBRATION

FIELD OF THE INVENTION

The present invention relates to a calibration device. More specifically, the present invention relates to a calibration device for an optical surface sensor.

BACKGROUND TO THE INVENTION

Optical surface sensors such as those described in U.S. Pat. No. 4,092,068 issued May 30, 1978 to Lucas et al, are particularly adapted for use in the paper industry to determine the surface roughness or surface smoothness of the paper sheet on a continuous basis as the sheet is travelling at relatively high speeds. Such devices are now installed on several paper machines. However, there is no means for checking the calibration of such devices nor is there means for comparing the outputs from such sensors in different mills i.e. thereby provide a more absolute measure of roughness.

BRIEF DESCRIPTION OF THE INVENTION

It is thus the object of the present invention to provide a calibration device suitable for calibrating such optical sensors.

Broadly the present invention comprises: a surface sensor calibrator having a holder, means for positioning a roughness sensor to be calibrated on said holder with optical elements on said sensor in position to contact the surface of a disc; means to rotate said disc relative to said optical sensor and means to simultaneously oscillate said disc in a direction substantially perpendicular to the axis of rotation of said disc.

BRIEF DESCRIPTION OF THE DRAWINGS

Further features, objects and advantages will be evident from the following detailed description of the preferred embodiments of the present invention taken in conjunction with the accompanying drawings in which:

FIG. 1 is an isometric view of the calibration device forming the present invention.

FIG. 2 is a plan view of the calibration device looking from the bottom up.

FIG. 3 is a section along the lines 3—3 of FIG. 2.

FIG. 4 is a section along the lines 4—4 of FIG. 2.

FIG. 5 is a partial section along the lines 5—5 of FIG. 2.

DETAILED DESCRIPTION OF THE INVENTION

Calibration device 10 is composed of an outer box having an upper wall or base plate 12 and side walls generally indicated 14 in FIG. 1. The base plate 12 is provided with an aperture 16 through which is exposed a rotating disc 18. The plate 12 and aperture 16 provide a means for positioning the sensor to be calibrated relative to the calibration disc 18 as will be described more fully hereinbelow.

As shown in FIGS. 2 and 3 the calibration device is mounted from the bottom of the base plate 12 and is composed of a platform 20 mounted on a rod or shaft 22 projecting from the base 12. Rod 22 has a collar 24 positioned between platform 20 and the base 12 to space the platform 20 from the base 12 and projects beyond the platform 20 by a significant distance to more accurately or firmly hold the platform 20 into position. This holding of the platform in position is obtained by a sleeve 26 rigidly attached to platform 20 and projecting therefrom on the side of the platform remote from the sleeve 24. Sleeve 26 and platform 20 are forced against collar 24 by a spring 28 forced against the end 30 of the sleeve 26 via a pressure nut 32 threaded onto the shaft 22. The nut 32 is preferably locked into position via lock-nut 34. This structure accurately positions the platform 20 while permitting same to rotate about the shaft 22.

In order to rotate the platform 20 above the shaft 22, a suitable crank mechanism generally indicated at 36 is provided. This mechanism includes a crank 38 which is connected at one end thereof to the platform 20 via a pin 40 and at its opposite end via a pin 42 to lever 44 which is keyed to the shaft 46 of the motor 48 to offset the pin 42 from the shaft 46 of the motor 48. Rotation of the shaft 46 rotates the arm 44 and moves the crank 38 which in turn via its pin connection 40 moves the platform 20. The motor 48 is supported from the base 12 via a suitable support 50.

The disc 18 is mounted on a suitable collar 52 via a screw 54 and the collar 52 is in turn fixed on the shaft 56 of the motor 58 via a suitable screw 60. The motor 58 is fixed to the platform 20 with the shaft and collar 52 projecting therethrough to position the disc 18 between the platform 20 and the base 12.

Suitable skid support means are provided for the disc 18 adjacent the point of contact of the optical sensor with the disc at a distance spaced from the axis of rotation of the shaft 50 to ensure that the point of contact of the optical sensor with the calibration disc 18 is always between the skids and the axis of rotation of the shaft 56.

In the illustrated arrangements, the skid support is provided by a pair of set screws 62 and 64 having smooth bottom surfaces 66 and 68 respectively. These bottom surfaces contact the side of the disc 18 adjacent to platform 20. Preferably the set screws 62 and 64 are threadably connected to the platform 20 so that they may easily be adjusted for proper initial positioning of the disc. Normally once set, these screws will require little if any adjustment. These skids insure that the surface of the disc 18 contacting the sensors remains substantially in a fixed plane.

In operation, the sensor to be calibrated is positioned on the base 12. The end of the sensor is schematically indicated in FIG. 5 via the dot-dash line 70 and is shown positioned on the base 12 with the end thereof having the optical sensor projecting through and centered on the aperture 16 so that the element 72 contacting the calibration disc 18 contacts the surface of the disc 18 and is oriented to the surface thereof in substantially the same manner as the sensor is oriented to a surface to be sensed when in use on a machine. The disc 18 is rotated by the motor 58 and is simultaneously oscillated back and forth on the pin 22 via the motor 48 and connecting link mechanism 36 so that the contact 72 of the optical sensor follows the surface of the disc 18 in a spiral path back and forth between the dot-dash lines 74 and 76 illustrated in FIG. 2. Thus, the sensor senses the roughness of the disc 18 in a spiral path or track between the boundaries 74 and 76 on the disc. Preferably, the speed of the disc 18 over the area of contact will be approximately equal to the speed of the paper machine on which the sensor is to be used. For standardization purposes, it may be desirable to operate the disc at a constant speed and to include appropriate calibration data into associated computer software. The sensor will act normally to determine the roughness of the disc and the reading of the sensor can then be compared with other sensors measuring the roughness of the same disc or the same sensor over spaced periods of operation.

Obviously, the discs cannot be made to a specific or controlled roughness and thus some central bureau must calibrate each disc and provide the calibration for the disc for use with the optical sensors. On the other hand, if the disc is simply used to maintain the calibration of a specific sensor on a specific paper machine, all that is required is to measure the change in indicated roughness that may occur over a period of time and to adjust the sensor accordingly.

It will be apparent that the time of contact of the sensor with the rotating disc can influence the measurement significantly if the time of contact is too short. It has been found that a calibration time of at least about 2 seconds and preferably about 10 seconds, for an oscillation rate via the linkage 36 of about 1 cycle per second, a 3¼ inch diameter disc 18 rotating at about 2,000 RPM and an area of contact between the contacting part of the sensor and the disc 18 having a maximum diameter of about 2½ inches and minimum diameter of about 2 inches any discrepancies will be averaged out.

Preferably the disc will be relatively stiff and formed of a synthetic pulp for durability reasons. In the illustrated arrangement the disc 18 is approximately 3¼ inches in diameter. The surface sensor contact 72 engages the disc surface along a spiral path extending approximately ¼ inch in the radial dimension of the disc and has a maximum radius of approximately 1¼ inches. The size of the disc and rates of oscillation and rotation are not critical. The relative speed between the point of contact of the sensor and disc should be approximately that of the speed of relative movement of sensor and surface being sensed and the rate of oscillation should insure the convolution of the tracks of the sensor contact on the disc are sufficiently spaced to sense different parts of the disc surface.

Modifications may be made without departing from the spirit of the invention as defined in the appended claims.

We claim:

1. A calibrator for calibrating surface sensors having optical parts adapted to contact a surface being sensed comprising; a base plate, a disc having a surface thereof lying substantially in a plane, means for positioning said roughness sensor to be calibrated in a fixed position on said base plate with said optical contacting part of said sensor in a position to contact the surface of said disc and oriented to said plane in substantially the same manner as said sensor is oriented to a surface to be sensed; means for rotating said disc with said surface of said disc in said plane and means to oscillate said disc in a direction substantially perpendicular to the axis of rotation of said disc whereby said optical sensor contacts said surface of said disc and moves back and forth in contact with said surface of said disc along substantially spiral paths.

2. A surface sensor calibrator as defined in claim 1 wherein said disc is rotatably mounted on a platform spaced from said base plate, said disc rotating in said plane between said platform and said base plate, said means for rotating said disc being mounted on said platform, said means to oscillate oscillating said platform and thereby said disc in said plane and an aperture in said base plate through which said optical contacting parts project to contact said surface of said disc.

3. A calibrator as defined in claim 2 wherein means for mounting said platform on said base member comprises a shaft projecting from said base member substantially perpendicular to said plane, a spacer surrounding said shaft and spacing said platform from said base member; a sleeve snugly surrounding said shaft on the side of said platform remote from said base member and extending a significant distance along said shaft and means for biasing said sleeve toward said platform.

* * * * *